(12) United States Patent
Nagel et al.

(10) Patent No.: US 8,905,228 B2
(45) Date of Patent: Dec. 9, 2014

(54) SELF-SUPPORTING CONVEYOR BELT

(71) Applicant: Laitram, L.L.C., Harahan, LA (US)

(72) Inventors: Jorge E. Nagel, New Orleans, LA (US);
Glenn R. McCall, Jr., Harvey, LA (US);
Stephen T. Ferrell, Slidell, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 13/757,992

(22) Filed: Feb. 4, 2013

(65) Prior Publication Data
US 2014/0216900 A1 Aug. 7, 2014

(51) Int. Cl.
*B65G 17/06* (2006.01)
*B65G 17/08* (2006.01)
*B65G 15/30* (2006.01)

(52) U.S. Cl.
CPC ............... *B65G 15/30* (2013.01); *B65G 17/08* (2013.01)
USPC ............ 198/852; 198/850; 198/851; 198/853

(58) Field of Classification Search
CPC ........................... B65G 17/067; B65G 19/287
USPC .................................................. 198/850–853
See application file for complete search history.

(56) References Cited

U.S. PATENT DOCUMENTS

| | | | |
|---|---|---|---|
| 1,136,578 A | 4/1915 | Ayres | |
| 2,987,168 A | 6/1961 | Franz | |
| 3,393,792 A * | 7/1968 | Virta | 198/851 |
| 4,266,661 A * | 5/1981 | Andersson | 198/822 |
| 4,394,901 A * | 7/1983 | Roinestad | 198/850 |
| 4,542,821 A * | 9/1985 | Livermore | 198/822 |
| 4,643,297 A * | 2/1987 | Krieger et al. | 198/867.02 |
| 4,688,670 A * | 8/1987 | Lapeyre | 198/853 |
| 4,899,871 A * | 2/1990 | Olsson | 198/778 |
| 4,941,568 A * | 7/1990 | Lapeyre | 198/853 |
| 5,183,149 A * | 2/1993 | Wierman et al. | 198/778 |
| 5,350,056 A * | 9/1994 | Hager | 198/778 |
| 5,489,020 A * | 2/1996 | Clopton | 198/851 |
| 5,702,245 A * | 12/1997 | London | 432/14 |
| 6,059,097 A | 5/2000 | Clopton | |
| 6,193,056 B1 * | 2/2001 | van Zijderveld et al. | 198/853 |
| 6,695,128 B2 * | 2/2004 | Palmaer et al. | 198/778 |
| 7,055,678 B2 * | 6/2006 | Gundlach et al. | 198/851 |
| 7,097,030 B2 * | 8/2006 | Gundlach | 198/834 |
| 7,178,662 B2 * | 2/2007 | Olsson et al. | 198/778 |

(Continued)

FOREIGN PATENT DOCUMENTS

| | | |
|---|---|---|
| FR | 1435044 A | 4/1966 |
| WO | 9965801 A1 | 12/1999 |
| WO | 2011138607 A2 | 11/2011 |

OTHER PUBLICATIONS

International Search Report and Written Opinion of the International Searching Authority, PCT/US2014/013812, mailed Apr. 22, 2014, European Patent Office, Rijswijk, NL.

*Primary Examiner* — Douglas Hess
(74) *Attorney, Agent, or Firm* — Catherine M. Bishop

(57) ABSTRACT

A self-supporting platform is formed of a plurality of hingedly connected modules. Adjacent modules may bend inwards against each other but resist flexing in the opposite direction. Each module includes a slotted module connector extending below the module body. The slotted module connector engages a peg to allow one-way bending of the modules relative to each other.

22 Claims, 14 Drawing Sheets

(56) References Cited

U.S. PATENT DOCUMENTS

| | | | |
|---|---|---|---|
| 7,374,035 B2 * | 5/2008 | Olsson et al. | 198/778 |
| 7,600,632 B2 * | 10/2009 | Hall | 198/848 |
| 7,967,132 B2 * | 6/2011 | Menke et al. | 198/853 |
| 8,522,962 B2 * | 9/2013 | Russell | 198/851 |
| 8,561,791 B2 * | 10/2013 | Bebejian | 198/853 |

* cited by examiner

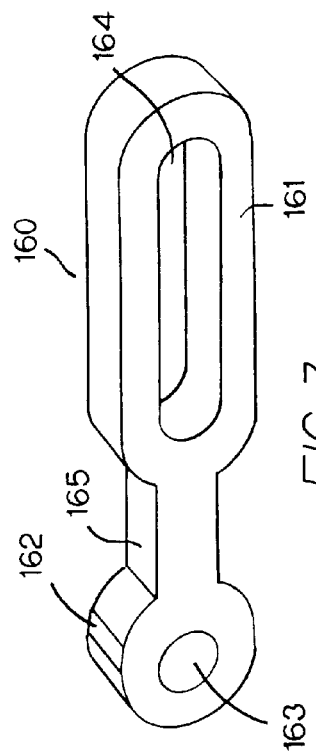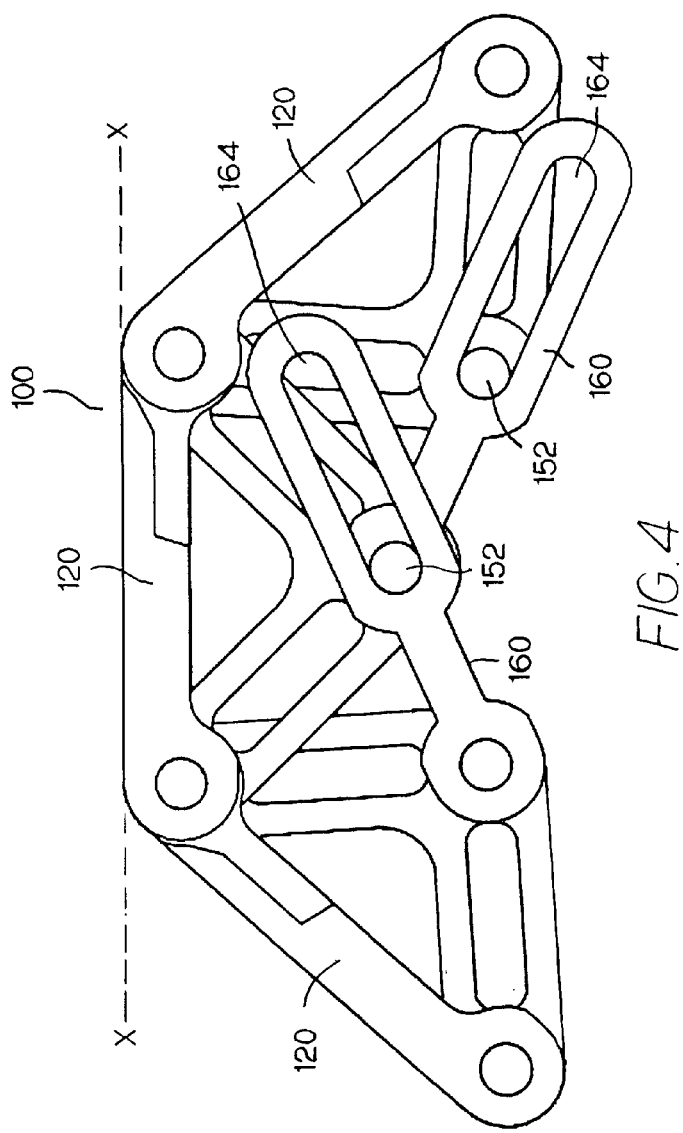

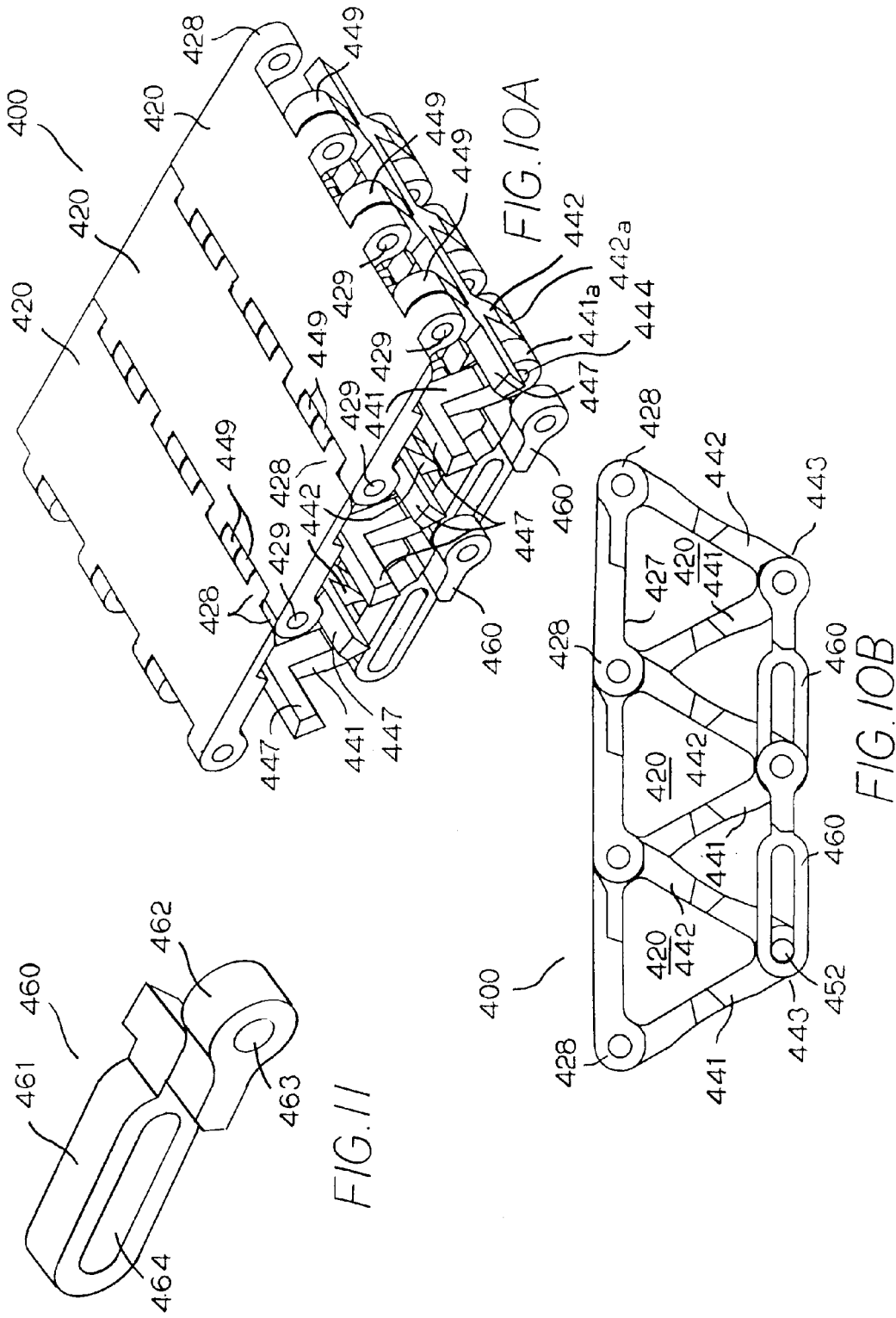

SELF-SUPPORTING CONVEYOR BELT

BACKGROUND

The invention relates generally to power driven conveyor belts. More particularly, the present invention relates to self-supporting modular plastic conveyor belts that allow bending in one direction while preventing bending in an opposite direction.

Conventional modular conveyor belts and chains are constructed of modular links, or belt modules, arranged in rows. Spaced apart hinge elements extending from each end of the modules include aligned openings. The hinge elements along one end of a row of modules are interleaved with the hinge elements of an adjacent row. A hinge rod, inserted in the aligned openings of interleaved hinge elements, connects adjacent rows together end to end to form an endless conveyor belt capable of articulating about a drive sprocket or drum.

To meet USDA sanitation requirements, conveyor belt systems must be cleanable. The conveyor carryway and frame are particularly susceptible to the accumulation of fats, dirt, and debris. Thus, there is a need for an easy-to-clean modular plastic conveyor belt system.

SUMMARY

A self-supporting platform forms a conveyor belt for a frameless or minimally framed conveying system. The conveyor belt is formed of a plurality of hingedly connected modules. Adjacent modules may bend inwards against each other but resist flexing in the opposite direction. Each module includes a slotted module connector extending downwards from the module body to allow one-way bending of the modules relative to each other.

According to one aspect, a module for a conveyor belt is provided. The module comprises a module body forming a top chord, a web extending from the module body, and a bottom chord hingedly connected to the web. The bottom chord has a slot for receiving a peg to connect the bottom chord to the web.

According to another aspect, a module for a conveyor belt comprises a module body including hinge elements on a first end and a second end, a module connector extending below the module body, a slot formed in the module connector, and a peg configured to be inserted into a slot of a module connector of an adjacent module.

According to still another aspect, a conveyor belt comprises a first module having a first module body and a first module connector connected to the first module body having a first slot, a first peg and a second module hingedly connected to the first module. The second module has a second module body. A second module connector is connected to the module body and has a second slot. The first peg is inserted in the second slot for allowing the first module to bend in a first direction relative to the second module while preventing bending in a second direction.

According to yet another aspect, a self-supporting conveyor belt comprises a plurality of hingedly connected modules, each module including a module body, hinge elements, a slotted module connector having a slot and a peg inserted into the slotted module connector. The peg slides in the slot to allow bending of the conveyor belt inwards from a substantially straight line in a first direction, while preventing bending from the substantially straight line in a second direction.

BRIEF DESCRIPTION OF THE DRAWINGS

These features and aspects of the invention, as well as its advantages, are described in more detail in the following description, appended claims, and accompanying drawings, in which:

FIG. 3 illustrates a slotted module connector of the conveyor belt of FIG. 2A;

FIG. 4 illustrates the self-supporting conveyor belt of FIG. 2A in a collapsed state;

FIG. 10A is an isometric view of a portion of a self-supporting conveyor belt according to another embodiment of the invention;

FIG. 10B is a side view of the conveyor belt of FIG. 10A;

FIG. 11 is an isometric view of the slotted module connector of the conveyor belt of FIG. 10A;

DETAILED DESCRIPTION

The present invention provides a self-supporting platform forming a modular plastic conveyor belt that eliminates or reduces the need for a conveyor frame. The invention will be described relative to certain illustrative embodiments. Those skilled in the art will appreciate that the present invention may be implemented in a number of different applications and embodiments and is not specifically limited in its application to the particular embodiments depicted.

Figure 1A:
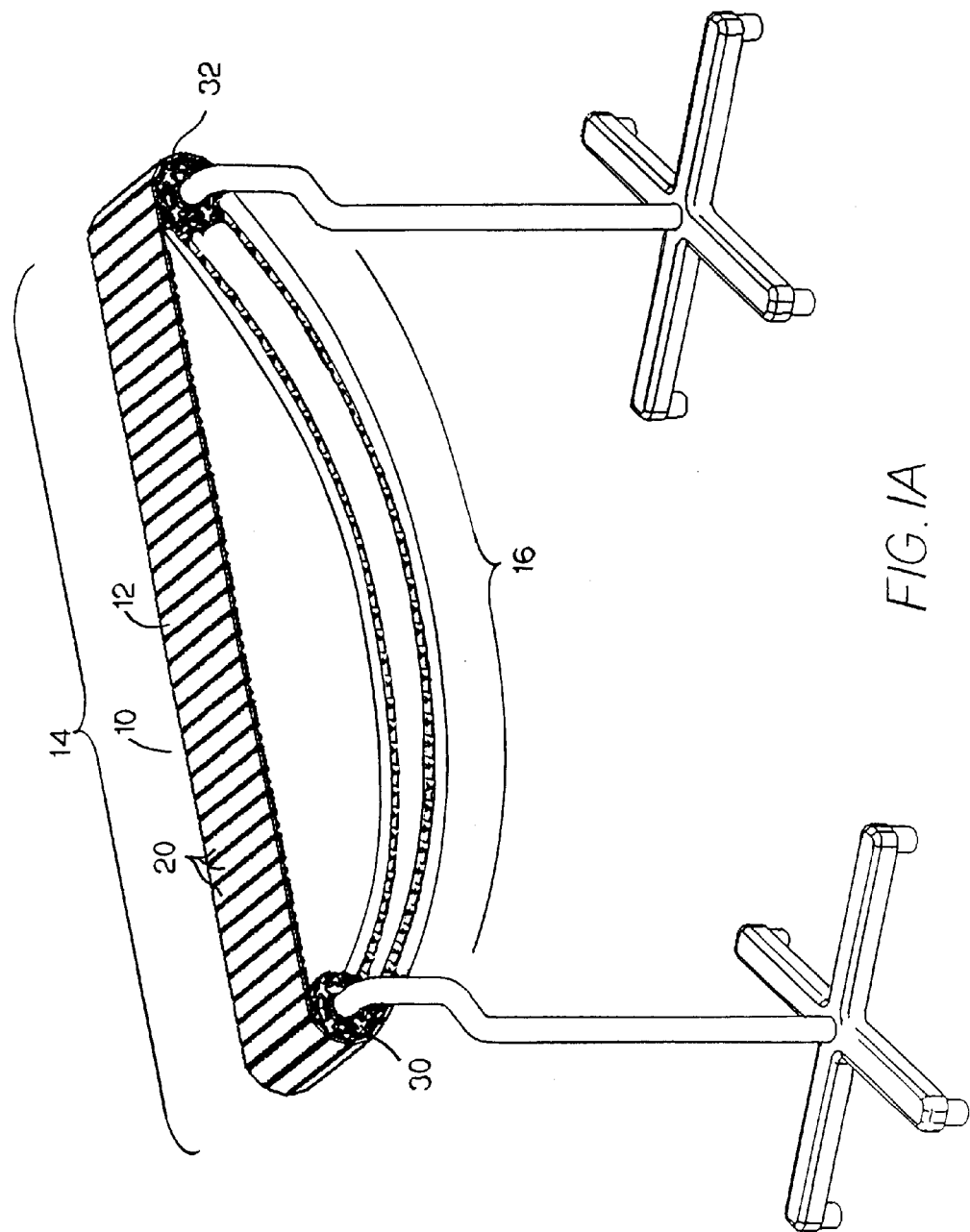
FIG. 1A is an isometric view of a conveying system including a self-supporting conveyor belt according to an illustrative embodiment of the invention.
Figure 1B:
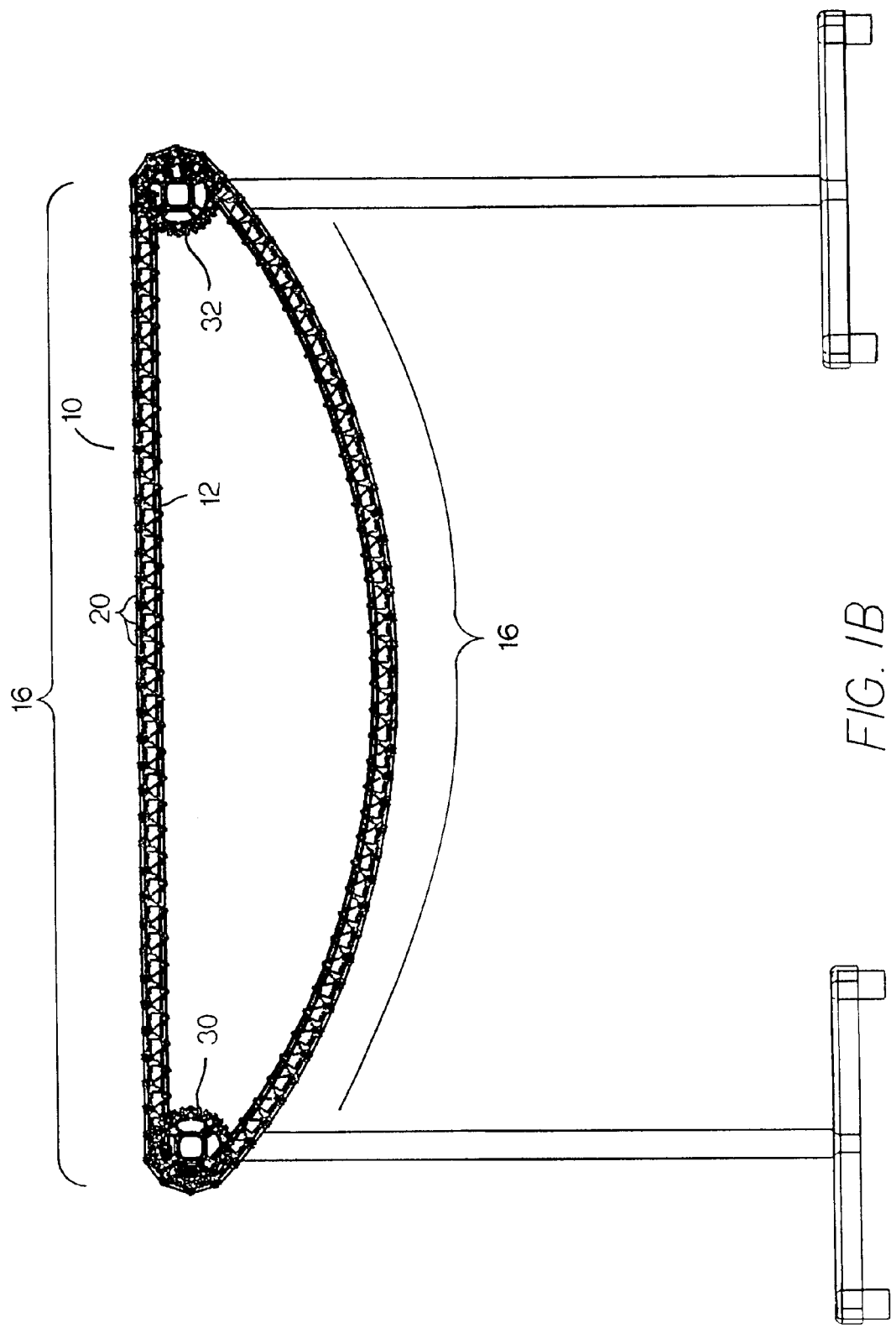
FIG. 1B is a side view of the conveying system of FIG. 1A.

FIGS. 1A and 1B illustrate a frameless conveying system including a self-supporting conveyor belt. The conveying system 10 includes a self-supporting conveyor belt 12 comprising a plurality of hinged modules 20 connected in an endless loop. Each row in the conveyor belt may comprise multiple modules arranged side-by-side, or a single module. Typical modular plastic conveyor belts are manufactured and sold, for example, by Intralox, Inc. of Harahan, La., USA. The belt modules are conventionally made by injection-molding thermoplastic materials such as polypropylene, polyethylene, acetal, nylon, or composite polymers, to name a few.

The belt articulates around sprockets 30, 32, one of which may be idle and one of which may be powered to drive the conveyor belt. The modules are connected so that adjacent modules may bend inwards against each other from a substantially straight line to a convex angle in relation to the loop. The conveyor belt may therefore conform to the sprockets 30, 32, but is resistant to flexing in the opposite direction, preventing backbend of the modules. As a result, the conveying section 14 of the conveyor belt 12 may behave like a rigid platform, which does not sag under the load of objects placed on it. The belt will articulate over sprockets and can sag in the returnway 16 of the loop. The anti-backbend design supports itself on the product carrying surface of the modules without requiring carryway rails, resulting in a cleaner conveyor design.

Figure 2A:
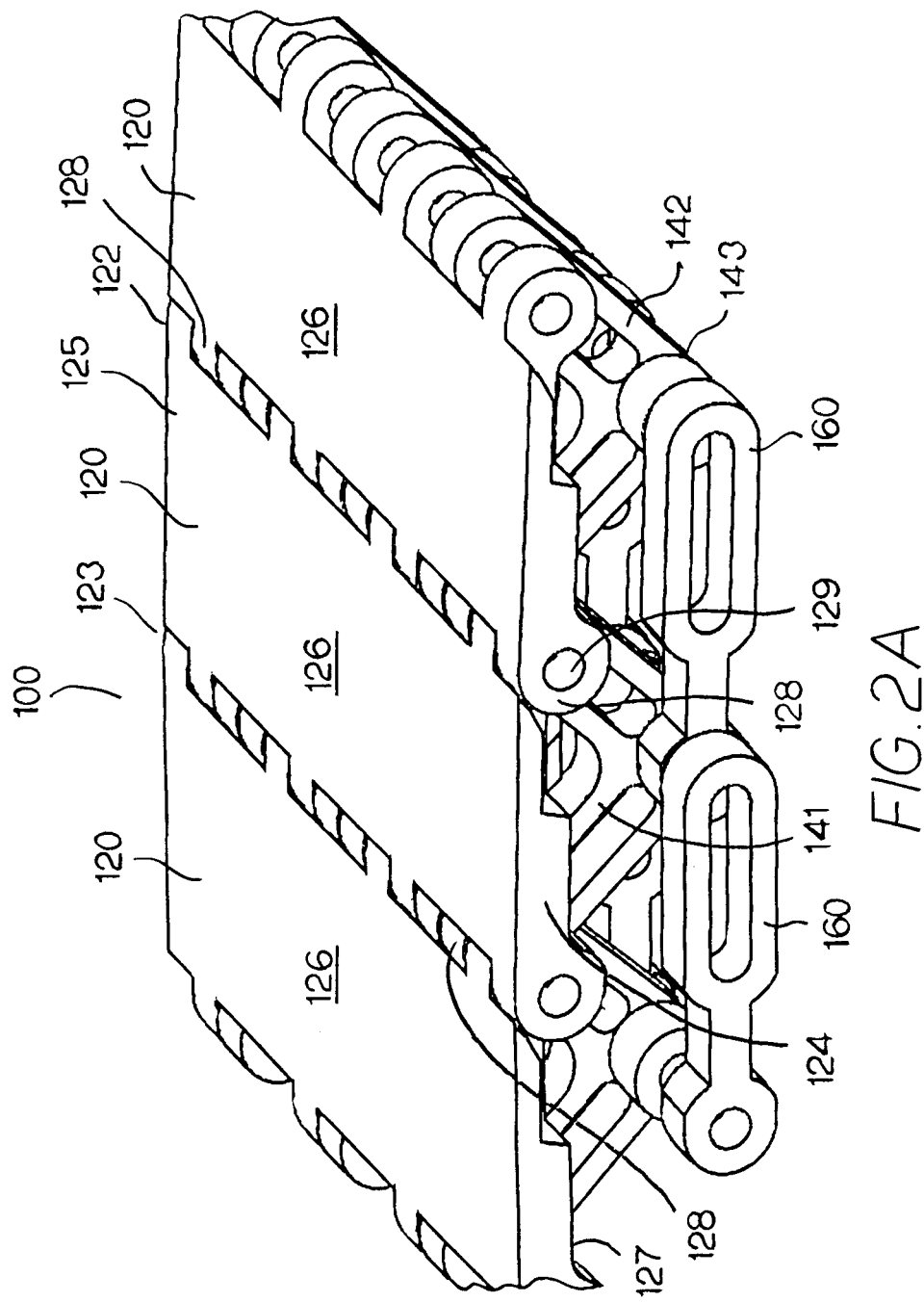
FIG. 2A is an isometric view of a portion of a self-supporting conveyor belt suitable for use in the conveying system of FIG. 1.
Figure 2B:
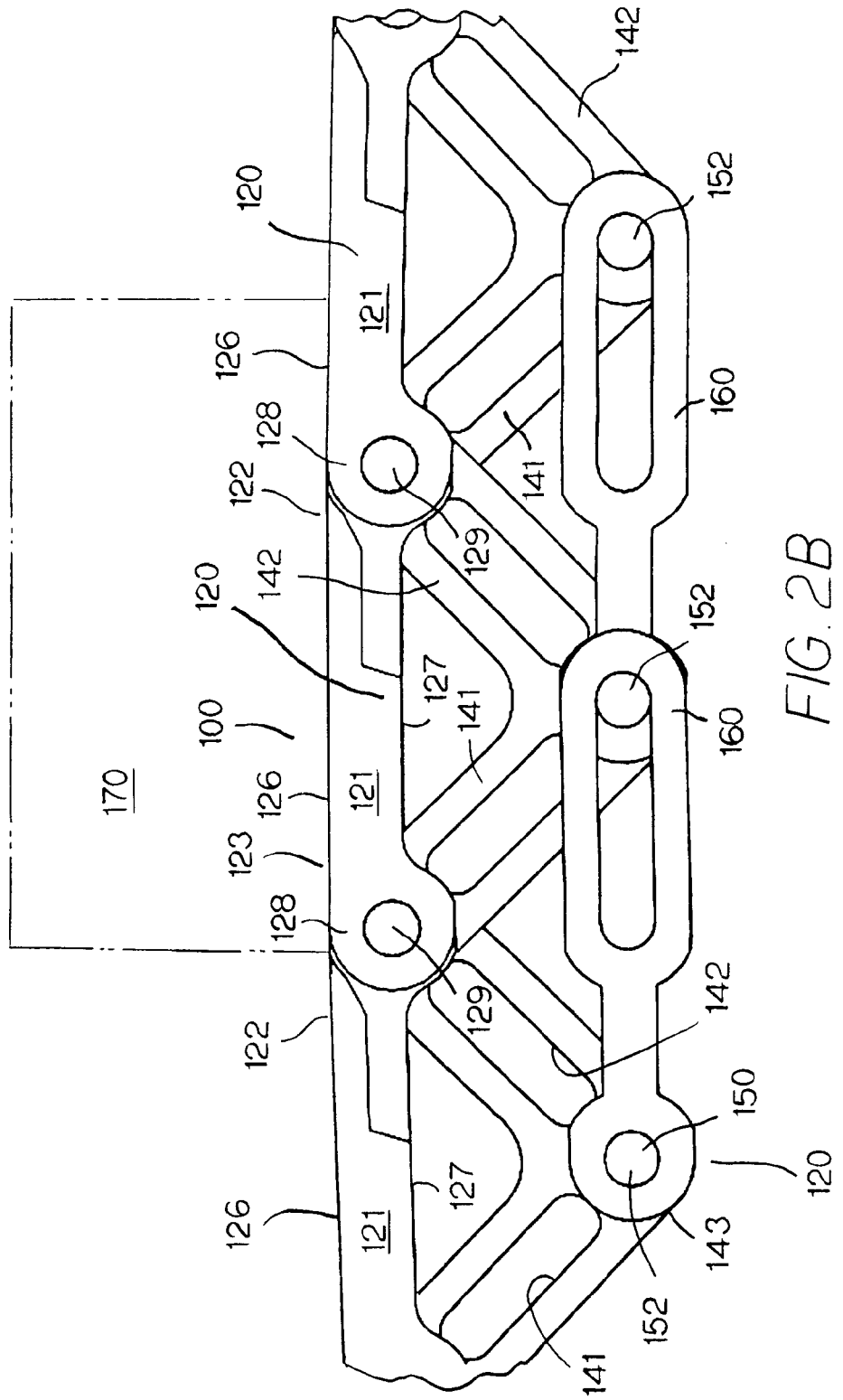
FIG. 2B is a side view of the portion of the self-supporting conveyor belt of FIG. 2A.

FIGS. 2A and 2B illustrate a portion of a conveyor belt 100 comprising hingedly connected modules 120 according to one embodiment of the invention. Each conveyor belt module includes a module body 121 extending in the direction of belt travel from a forward (lead) end 122 to a rear (lag) end 123 and in width from a first side edge 124 to a second side edge 125. The module body 121 includes an outer conveying surface 126 on which articles are conveyed and an inner surface 127, which may be a drive surface for engaging a sprocket or other device for driving the belt. Linking elements, illustrated as hinges 128, extend from each end 122, 123 for linking the modules together end to end. The hinges 128 include aligned hinge openings 129. The hinges of adjacent modules are interleaved and a hinge pin (not shown) is inserted through the aligned hinge openings 129 to connect two modules together.

The conveyor belt modules 120 form a collapsible truss system to allow one-way bending of modules relative to each other. The collapsible truss system comprises webs 141, 142 extending transversely downwards from the bottom surface of the module body 121, which forms the upper chord of the truss. The illustrative webs 141, 142 include longitudinal slots, but the invention is not so limited. The webs 141, 142 converge at an apex 143. An opening 150 extends through the webs at the apex. A slotted module connector 160 forms a bottom chord for the truss. The slotted module connector, shown in FIG. 3, comprises a slotted section 161 having an elongated slot 164 at a first end, a second end 162 including an opening 163, and a strip 165 connecting the slotted section 161 and the second end 162. The opening 163 in the slotted module connector preferably matches the opening 150 in the apex of the webs.

The slotted module connector 160 connects two adjacent modules using pegs, illustrated as connecting rods 152. Each connecting rod 152 passes through the slot in the slotted section of a first module connector, through the second opening 163 of an adjacent slotted connector 160 and through the opening 150 in the apex. The connecting rod 152 thus joins the webs of adjacent modules in a manner that allows the modules to bend in one direction, as shown in FIG. 4, while remaining rigid in the other direction.

Each module may include a series of webs 141, 142 and slotted module connectors 160 across the width of the belt.

As shown in FIG. 2B, the conveyor belt supports a load 170 applied to the conveying surface 126 without sagging and distributes the weight of the load across multiple connected modules. The slotted module connector 160 inhibits separation of adjacent webs apexes, preventing backbending of the modules.

As shown in FIG. 4, the slot 164 in the slotted module connector 160 allows the connecting rod 152 to slide inwards relative to the slotted module connector. The modules can bend inwards relative to each other from a straight line X-X. In an intermediate state, the connecting rods 152 are pushed to an intermediate location in the slot 164. FIG. 4 illustrates the portion of the conveyor belt 100 in a fully collapsed state, with the connecting rod 152 pushed to the distal end of the slot 164.

The forward end 122 and the rear end 123 of the module body 121 may be shaped to promote one-way flexing of the conveyor belt. For example, the forward end 122 may extend at a non-right angle relative to the outer and inner bottom surfaces, and the rear end 123 may have a complementary profile to the forward end. In the illustrative embodiment, the module body 121 has a parallelogram-shaped profile to promote one-way bending.

Figure 5A:
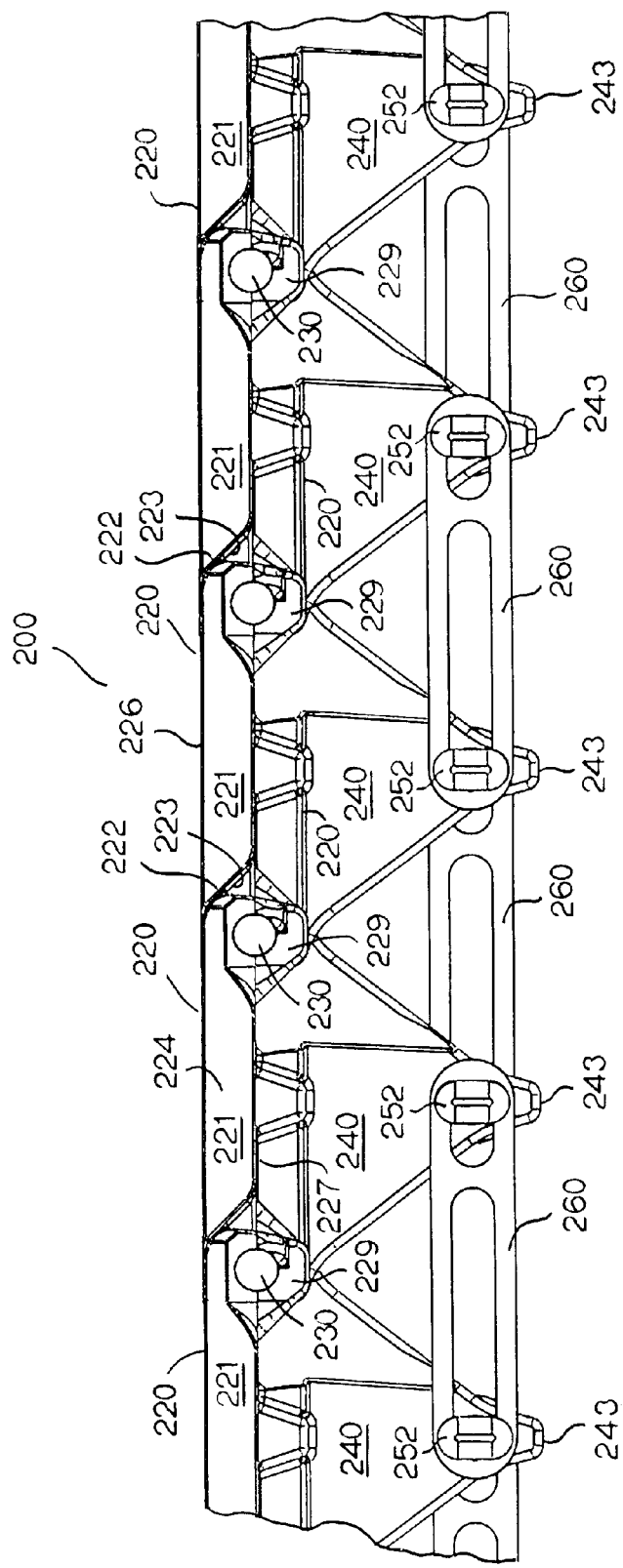
FIG. 5A is a side view of a portion of a self-supporting conveyor belt according to another embodiment of the invention.
Figure 5B:
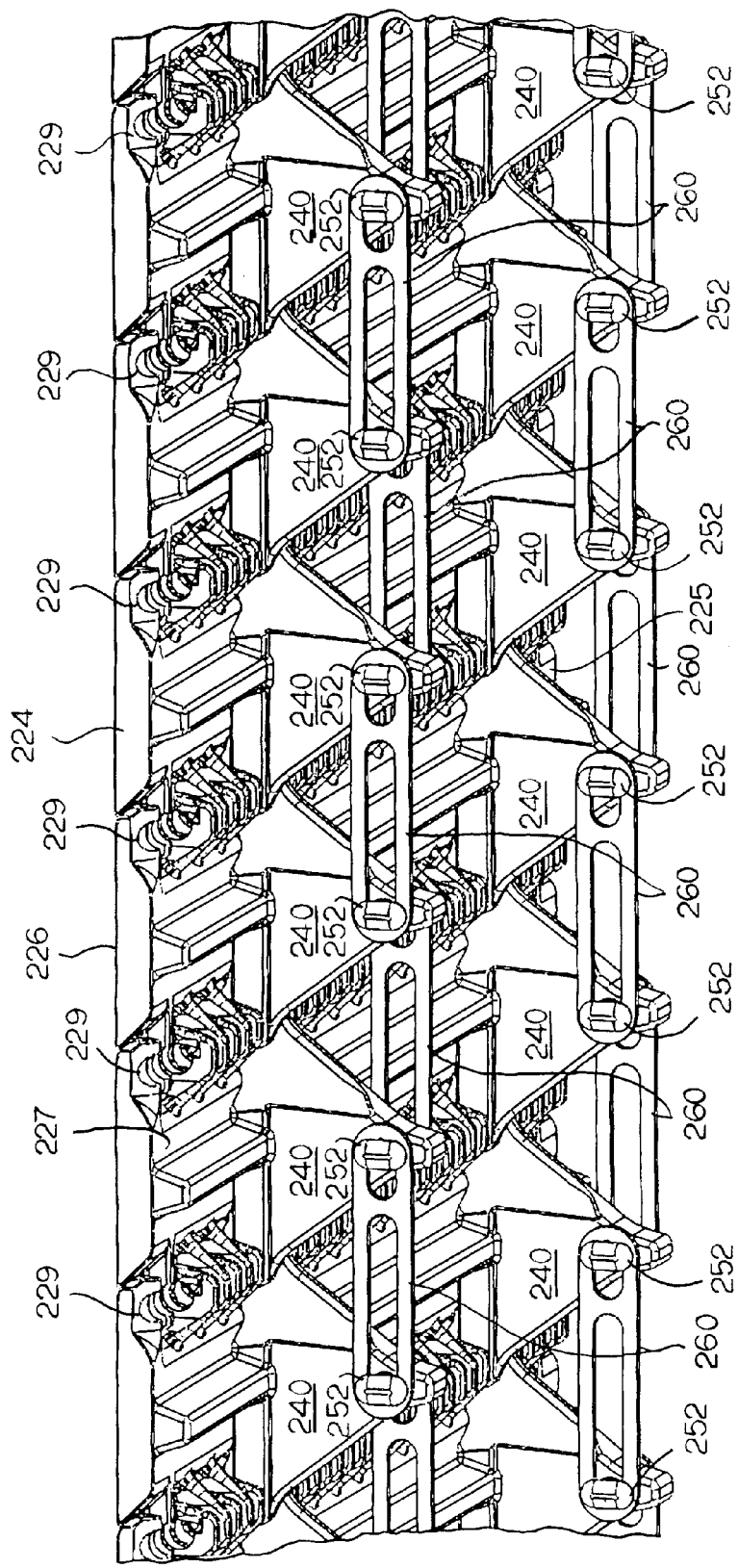
FIG. 5B is a bottom view of the belt of FIG. 5A.

FIGS. 5A and 5B illustrate a collapsible truss system for a conveyor belt that enables the belt to be self-supporting and flexible in only one direction according to another embodiment of the invention. The conveyor belt 200 comprises a plurality of hingedly connected modules 220. Each module comprises a module body 221 extending longitudinally from a first end 222 to a second end 223, in width from a first side edge 224 to a second side edge 225 and in thickness from outer conveying surface 226 to an inner surface 227. Hinges 229 and hinge pins 230 connect adjacent modules together. The forward end 222 and rear end 223 may be shaped to promote one-way bending of the conveyor belt.

The collapsible truss system comprises a top chord, formed by the module body 221, a slidable bottom chord, formed by a slotted module connector 260, and a truss web, formed by protrusion 240 extending from the inner surface 227 of the module body, extending between the top and bottom chord. Each module may have a plurality of protrusions 240. The illustrative protrusions 240 are substantially triangular, tapering from a base at the inner surface 227 to an apex 243. The base of the protrusions may be integral with certain of the hinge elements 229. Pegs 252 extend from each face of the protrusion at the apex. Each peg 252 comprises a thin neck and a thicker head.

Figure 6:
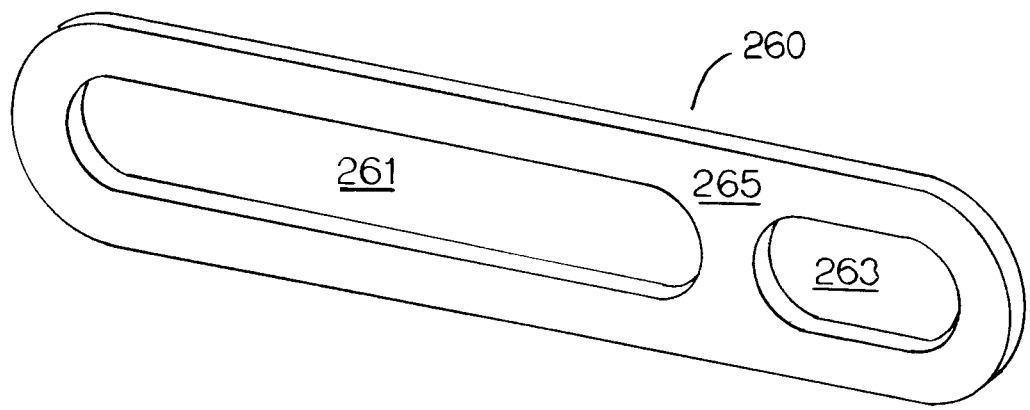
FIG. 6 is an isometric view of the slotted module connector of the conveyor belt of FIGS. 5A and 5B.

The slotted module connector 260, shown in FIG. 6, comprises two slotted openings 261, 263 formed in an elongated oval base 265. The first slotted opening 261 is larger than the second slotted opening 263, allowing the associated peg on a module to slide within the opening 261. The slotted module connector 260 is slightly flexible to allow insertion of the ring over two adjacent pegs on adjacent modules. A plurality of slotted module connectors 260, on alternating sides of protrusions, links the protrusions of a plurality of modules together.

Figure 7:
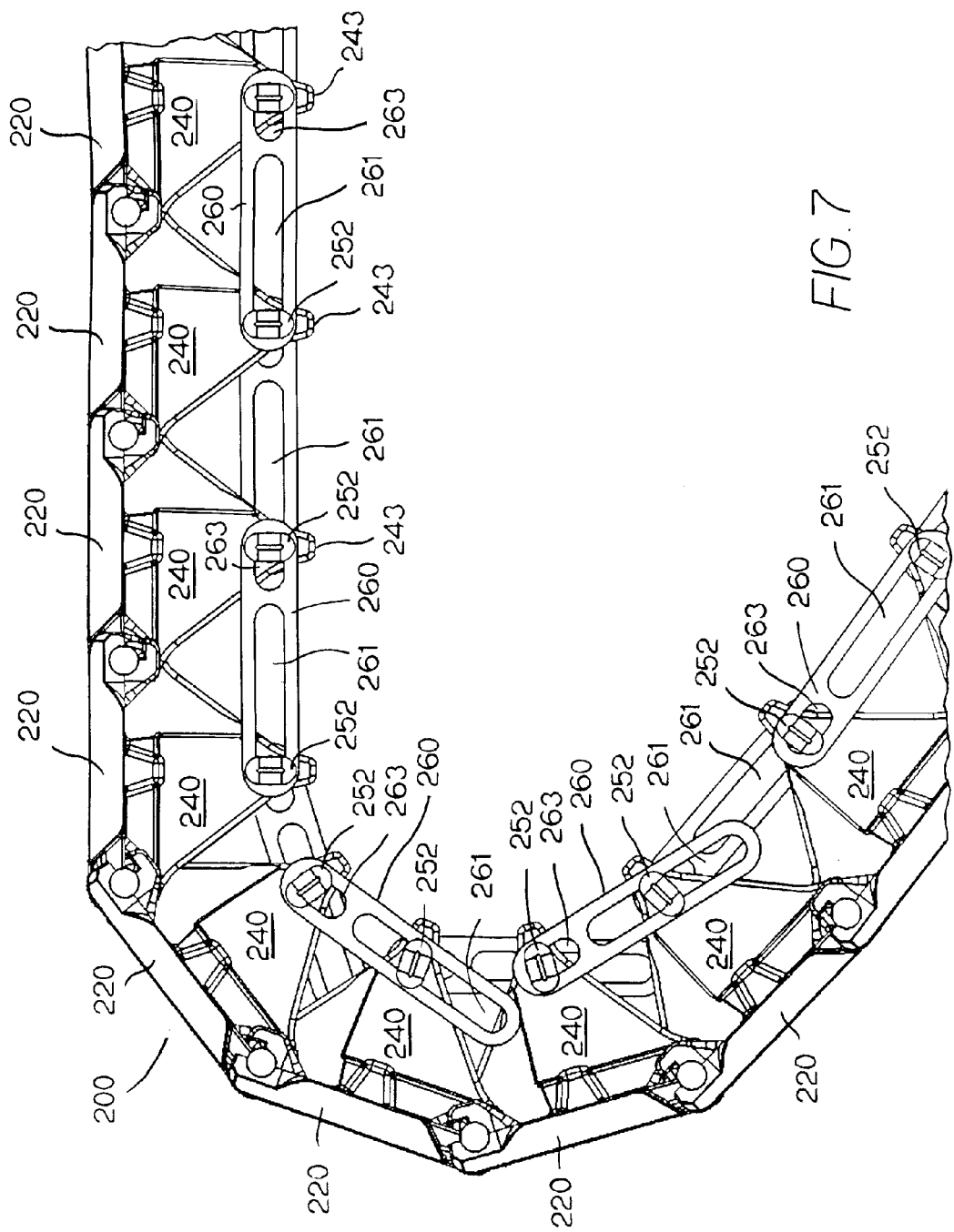
FIG. 7 is a side view of a portion of self-supporting conveyor belt of FIGS. 5A and 5B when bending inwards.
Figure 8:
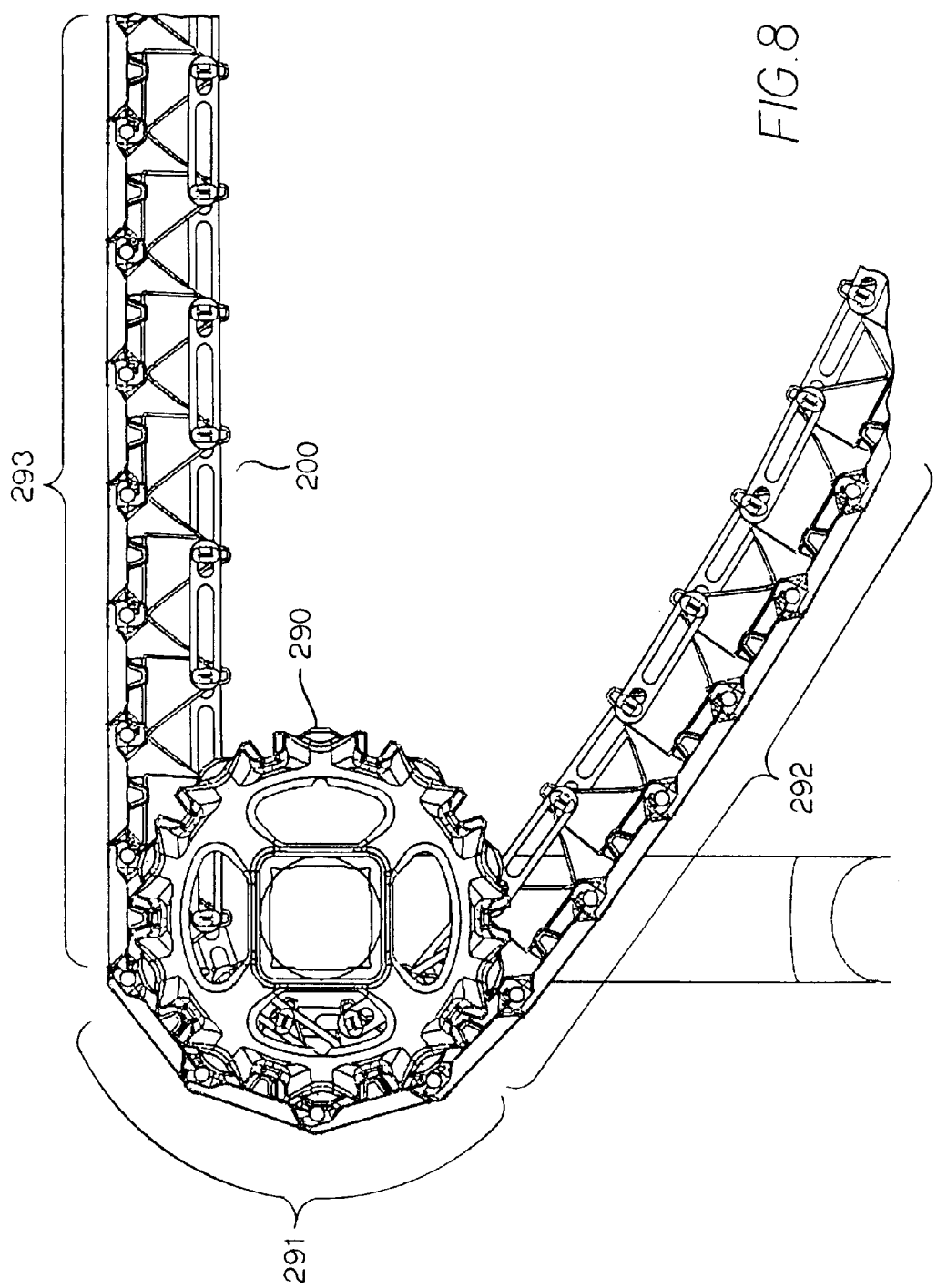
FIG. 8 is a side view of a portion of the self-supporting conveyor belt of FIGS. 5A and 5B bending around a sprocket.

As shown in FIGS. 7 and 8, the slotted module connectors 260 allow bending of the modules inwards relative to each other, with pegs 252 sliding within the corresponding slots 261 of the module connectors as adjacent apexes 240 converge. The slotted module connectors 260 prevent backbending of the modules relative to each other. For each protrusion 240, a first peg slidably engages the slot 261 of a first module connector 260, while a second peg is retained within the smaller opening 263 of an adjacent module connector 260. The first peg slides within the first slot 261 towards the second opening to allow inward bending of the modules. Thus, as shown in FIG. 8, the conveyor belt 200 can bend around a sprocket 290 in a transition region 291, and can sag in a returnway 292, while remaining rigid in a carryway region 293.

Figure 9A:
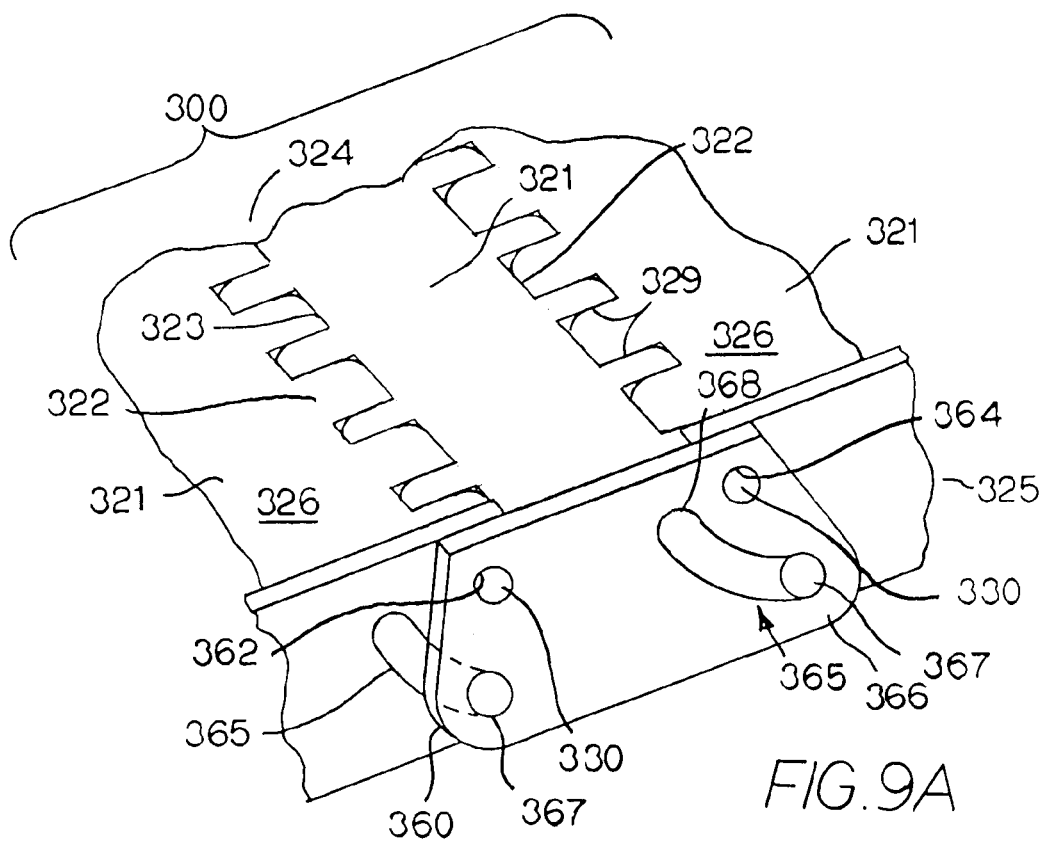
FIG. 9A illustrates a portion of a self-supporting conveyor belt according to another embodiment of the invention.
Figure 9B:
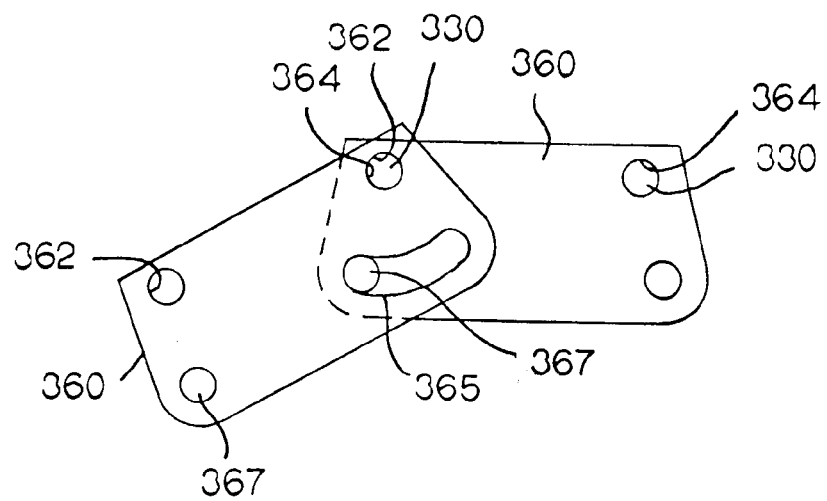
FIG. 9B is a side view of two interacting side plates of the conveyor belt of FIG. 8A.

FIGS. 9A and 9B show another embodiment of a self-supporting conveyor belt 300 employing a slotted module connector. The conveyor belt 300 comprises a plurality of hingedly connected modules 326. Each module comprises a module body 321 extending longitudinally from a forward (lead) end 322 to a rear (lag) end 323, in width from a first side edge 324 to a second side edge 325 and in thickness from outer conveying surface 326 to an inner surface (not shown). Hinges 329 and hinge pins 330 connect adjacent modules together.

Each module includes a slotted module connector 360, illustrated as a side plate, extending downwards from the outer side edge 325 of the module body 321. Each slotted module connector 360 includes two upper openings 362, 364 for receiving hinge pins 330 to connect the slotted module connector to the side of the module body. A slot 365 extends transversely across the body of the slotted module connector from a first end 366 at the bottom right side of the connector to a second end 368 in the middle of the connector. The illustrative slot 365 is curved. A peg 367 extends from the body of the side plate at the bottom left side.

A slot 365 on a first side plate 360 slidably receives a peg 367 of an adjacent side plate 360. The slot 365 provides limited flexibility for the assembly, allowing the belt to sit flat in one direction and curl in the other direction.

FIGS. 10A and 10B show another embodiment of a self-supporting conveyor belt 400 employing a slotted module connector. The conveyor belt 400 comprises a plurality of hingedly connected modules 420, three of which are shown in FIGS. 10A and 10B. In the embodiment of FIGS. 10A and 10B, each module 420 includes a series of webs 441, 442 extending from the bottom surface 427 of the module. The lead web 441 is laterally offset from the lag web 442. The webs 441, 442 converge and overlap at an apex 443. The apex 441a of the lead web 441 includes a rod opening 444 that aligns with a rod opening (not shown) in the apex 442a of the lag web 442. Crossbeams 447 extend the width of the module and connect the series of webs 441, 442. Each web 441, 442 extends from the apex 443 to a second web end at the forward end or lead end of the module. The second end 449 of each web 441, 442 aligns with and adjoins a hinge element 428 of the module. The second web end 449 includes an opening aligned with a hinge rod opening 429 in the hinge element to allow a hinge rod to pass therethrough.

The conveyor belt 400 further includes slotted module connectors 460, shown in FIG. 11, for slidably connecting the undersides of adjacent modules 420. In the embodiment of FIGS. 10A and 10B, each slotted module connector includes two offset sections: a slotted section 461 and a round section 462. The slotted sections 461 of adjacent slotted module connectors align with each other along the length of the belt, and the round sections 462 align with each other. The slotted section 461 of a lagging slotted module connector abuts and overlaps the round section 462 of a lead slotted module connector. A connecting rod 452 extends through the opening 463 of the round section of a first slotted module connector 460, through the slot 464 of an adjacent slotted section 464 and through openings in the web apexes 441a, 442a to slidably connect the underside of the adjacent modules.

Figure 12:
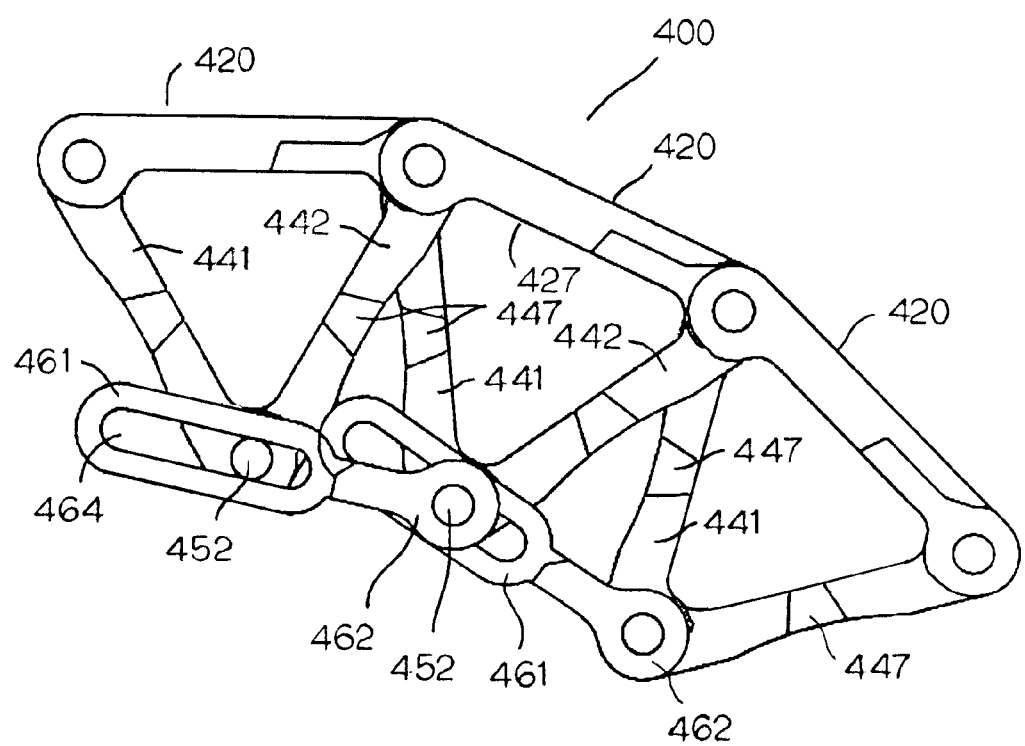
FIG. 12 illustrates the conveyor belt of FIG. 10A in a semi-collapsed state.

As shown in FIG. 12, the slotted module connectors 460 enable one-way bending of the modules 420 relative to each other. As shown, the connecting rod 452 slides through the slot 464 while maintaining its position relative to the webs 441, 442.

Figure 13:
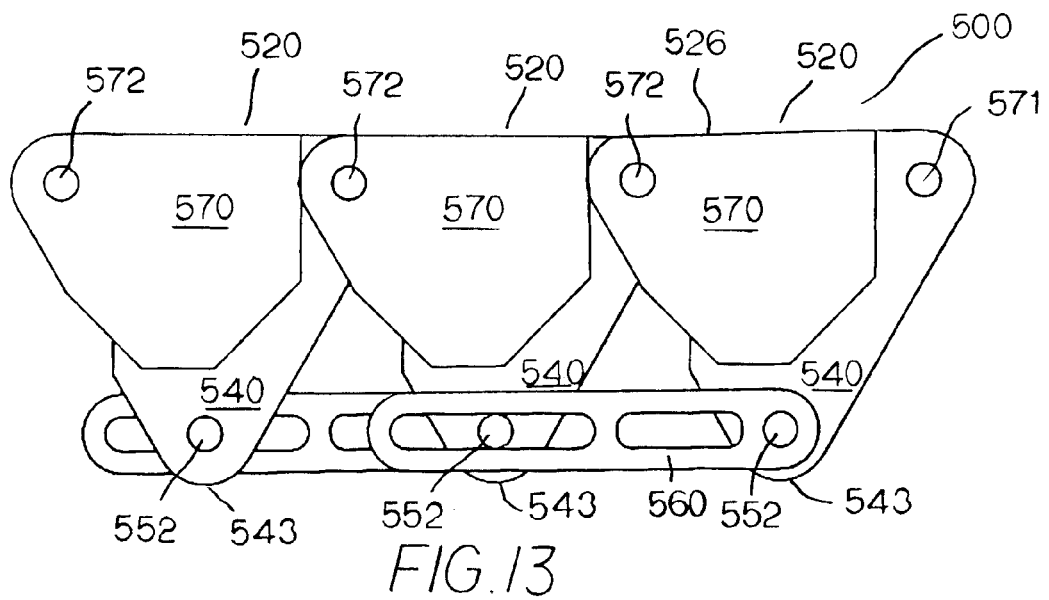
FIG. 13 is an isometric view of a portion of another embodiment of a self-supporting conveyor belt.
Figure 14A:
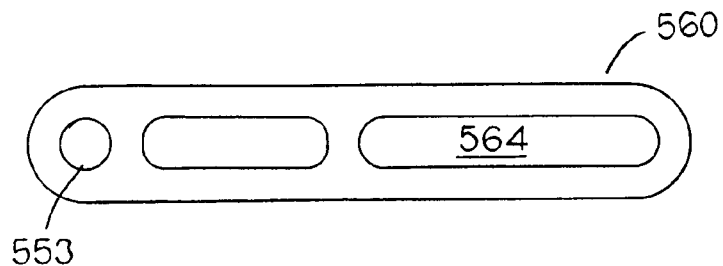
FIG. 14A illustrates the slotted module connector of the embodiment of FIG. 13.
Figure 14B:
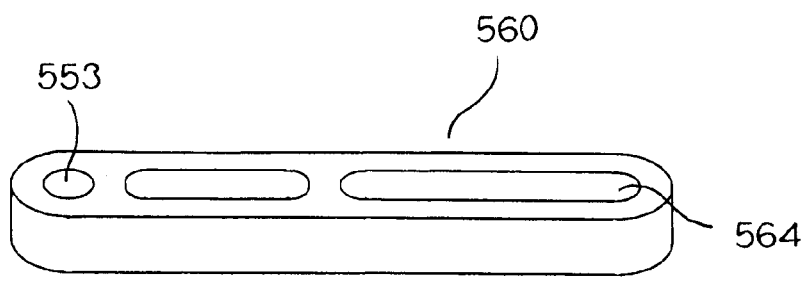
FIG. 14B is another view of the slotted module connector of FIG. 14A.

FIG. 13 shows another embodiment of a conveyor belt 500 employing a slotted module connector 560 to allow one-way bending of the modules 520 relative to each other. Each module 520 includes side plates 570 and openings 571 for hingedly connecting the modules to each other. Each side plate opening 572 aligns with an opening 571 of an adjacent module and a hinge rod passes through the aligned openings to join the modules together. A web 540 extends down from an upper conveying surface 526 and tapers to a web apex 543. Each web apex 543 includes pegs 552 extending from both sides of the web apex. A slotted module connector 560, shown in FIGS. 14A and 14B, connects the web apexes 543 of adjacent modules. The slotted module connector 560 includes a round opening 553 at a first end and an elongated slot 564 at a second end. A peg 552 of a first module passes through the round opening 553 of a slotted module connector and a peg 552 of a second adjacent module passes into the elongated slot 564 of the slotted module connector. The slotted module connectors 560 are alternately placed on either side of the web apexes 543. The slotted module connectors 560 allows the modules 520 to bend inwards relative to each other while preventing back flexing of the conveyor belt.

A slotted module connector according to various embodiments of the invention can be used to join two adjacent conveyor belt modules to allow one-way flexing of the modules relative to each other, while preventing bending of the modules in the other direction. The thus-connected modules may form a self-supporting conveyor belt in a frameless conveying system. Alternatively, the modules connected through a slotted module connector could form a one-way flexible sled or tray for conveying articles.

In another application, a series of modules may be connected using a slotted module connector of an embodiment of the invention to form another type of platform. For example, a plurality of hingedly connected modules with slotted module connectors connecting the undersides of the modules to allow for one-way bending of the modules relative to each other may be used to form a roll-up ramp for cargo or other purposes. In another application, a plurality of hingedly connected modules with slotted module connectors connecting the undersides of the modules to allow for one-way bending of the modules relative to each other may be used to form a portable or roll-up bridge. In another embodiment, a roll-up table may be formed using a plurality of modules connected with slotted module connectors to allow one-way bending. Other applications include roll-up stages, shelters, roofing and other applications requiring a self-supporting platform that may bend on one direction but is incapable of bending in an opposite direction.

Although the invention has been described with reference to specific versions, other versions are possible. The scope of the invention is not meant to be limited to the exemplary versions described in detailed.

What is claimed is:

1. A module for a conveyor belt comprising:
    a module body forming a top chord;
    a first set of hinge elements extending from a first end of the module body;
    a second set of hinge elements extending from a second end of the module body;
    a web extending down from the module body; and
    a bottom chord hingedly connected to the web, the bottom chord having a slot for receiving a peg to connect the bottom chord to the web.

2. The module of claim 1, wherein the web includes a peg extending from a side surface of the web.

3. The module of claim 1, wherein the web includes an opening for receiving a peg.

4. The module of claim 1, wherein the bottom chord comprises a first slot for receiving a first peg and a second slot that is larger than the first slot for receiving a second peg.

5. The module of claim 1, wherein the bottom chord comprises a slotted section, a strip extending from the slotted section and an opening for a peg formed in a distal end of the strip.

6. The module of claim 1, wherein the web comprises two beams extending from a bottom surface of the module body and converging at an apex, the apex including an opening for receiving a peg.

7. The module of claim 1, wherein the web comprises a triangular protrusion extending from a bottom surface of the module body, wherein pegs configured to be inserted in the slot extend from an apex of the triangular protrusion.

8. The module of claim 1, wherein the module body has a front edge extending transversely relative to a conveying surface of the module body and a rear edge that is complementary to the front edge.

9. A module for a conveyor belt comprising:
   a module body including hinge elements on a first end and a second end;
   a module connector below the module body and the hinge elements, the module connector hingedly connected to the module body;
   a slot formed in a first end of the module connector;
   a round opening in a second end of the module connector; and
   a peg configured to be inserted into a slot of a module connector of an adjacent module.

10. The module of claim 9, wherein the module connector is connected to the module body using a hinge pin inserted through the hinge elements.

11. The module of claim 9, wherein the module connector comprises a slotted section at the first end, and a strip extending between the slotted section and the round opening.

12. The module of claim 9, further comprising a web extending from the bottom surface of the module body and connected to the module connector through the peg.

13. The module of claim 12, wherein the peg is integral with the web.

14. The module of claim 9, wherein the peg is integral with the module connector.

15. A module for a conveyor belt comprising:
   a module body forming a top chord;
   a triangular web forming a protrusion extending from a bottom surface of the module body;
   a first peg extending from an apex of the triangular web; and
   a bottom chord hingedly connected to the web, the bottom chord having a slot for receiving the first peg to connect the bottom chord to the web.

16. The module of claim 15, further comprising:
   hinge elements extending from first and second ends of the module body.

17. The module of claim 15, further comprising:
   a second peg extending opposite the first peg from the apex.

18. The module of claim 15, wherein the bottom cord includes a round opening on an opposite end from the slot for receiving a peg of another module.

19. A module for a conveyor belt comprising:
   a module body forming a top chord;
   a web comprising two beams extending from a bottom surface of the module body and converging at an apex, the apex including an opening for receiving a peg; and
   a bottom chord hingedly connected to the web, the bottom chord having a slot for receiving the peg to connect the bottom chord to the web.

20. The module of claim 19, further comprising:
   hinge elements extending from first and second ends of the module body.

21. The module of claim 19, wherein the bottom chord includes a round opening on an end opposite from the slot for receiving a peg of another module.

22. The module of claim 21, wherein the round opening is included in a section that is offset from a slotted section in which the slot is formed.

\* \* \* \* \*